No. 785,390. Patented March 21, 1905.

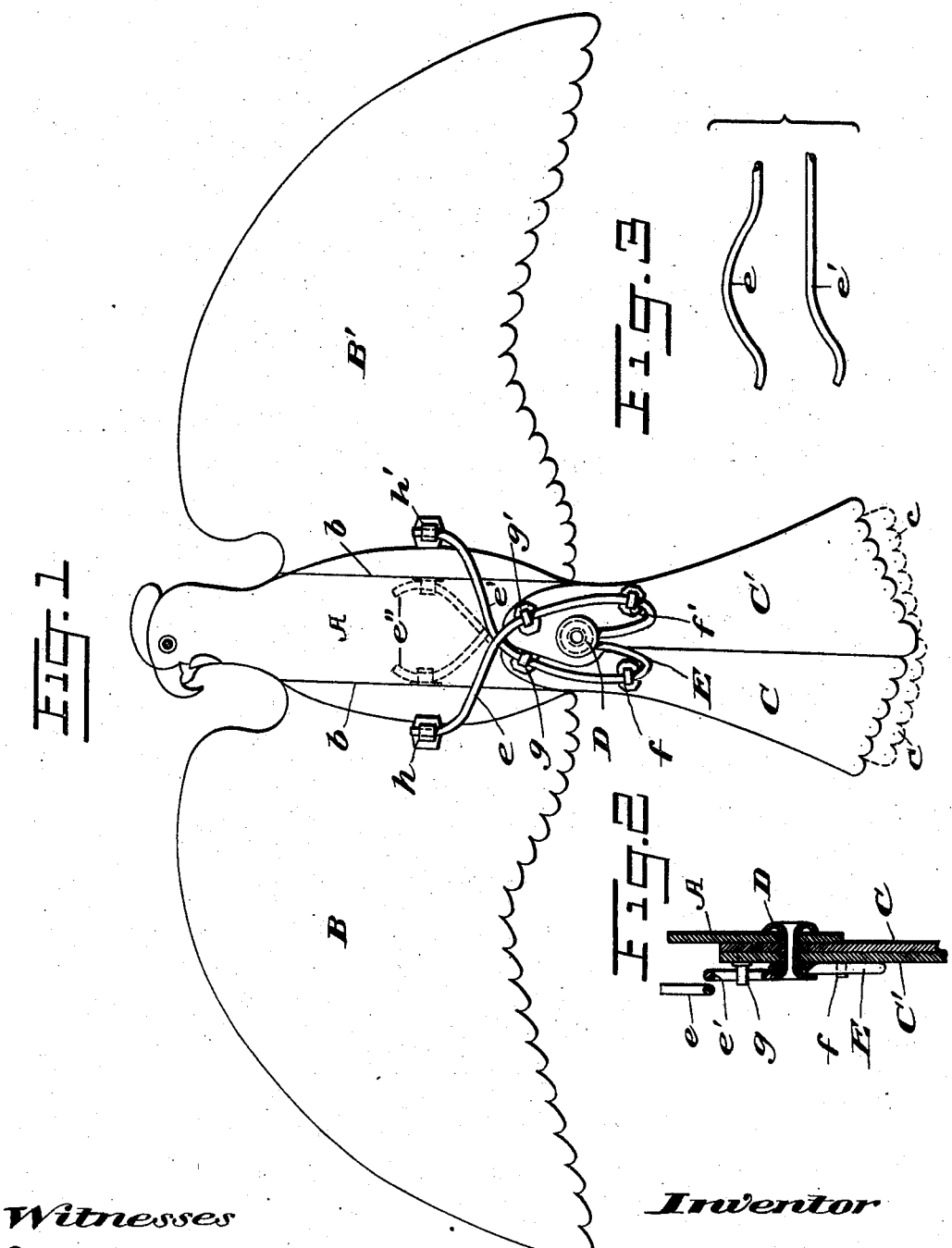

UNITED STATES PATENT OFFICE.

WILLIAM G. G. WEIDINGER, OF CHICAGO, ILLINOIS, ASSIGNOR OF TWO-THIRDS TO EDA WEIDINGER AND EMMA WEIDINGER, OF CHICAGO, ILLINOIS.

FAN.

SPECIFICATION forming part of Letters Patent No. 785,390, dated March 21, 1905.

Application filed August 26, 1904. Serial No. 222,211.

*To all whom it may concern:*

Be it known that I, WILLIAM G. G. WEIDINGER, a citizen of the United States of America, and a resident of the city of Chicago, in the county of Cook and State of Illinois, have invented a certain new and useful Improvement in Fans, of which the following is a specification.

My invention relates to fans; and the object thereof is to provide a cheap, simple, and attractive novelty which will be available for advertising purposes, as well as amusement and general use.

In carrying out the principles of my invention I provide a relatively stationary portion, vibratory members by the use of which the air-currents are produced, and handles so related to the stationary portion and to the vibratory members that the latter are intermittently moved from and returned to their normal position when the handles are moved.

The principles of my invention are illustrated in the drawings, in which—

Figure 1 represents one of my improved fans, showing the wings extended. Fig. 2 is a cross-section of a portion thereof through the handle-attaching rivet, and Fig. 3 shows the side view of a portion of the actuating-springs.

Further describing my invention by reference to the drawings, A may and preferably does represent the body and head of a bird. B and B' are wing portions hinged thereto on the lines $b$ and $b'$.

C and C' are members pivoted to the body portion A by the rivet or eyelet D and which are adapted to close over and upon each other and form a handle. A spring E may be made of a continuous wire bent into the inverted-heart shape shown in the drawings, so that the central portion surrounds and is secured by the rivet D. It should diverge from the wire, pass through the securing-clips $f$ and $f'$ and $g$ and $g'$ on the handles, and the free ends $e$ and $e'$ pass into the clips $h$ and $h'$ on the wings in which they are pivoted, so as to turn freely. The free ends of the wires are shaped to permit them to pass each other without interference, as shown in Fig. 3. The lower parts of the spring as they diverge from the pivot D tend at all times to keep the handle members in their divergent positions.

When the handle members C and C' are compressed in the hands of the user, they turn upon the pivot D against the tension of the lower part of the spring E, so that one passes over the other, the two assuming the position shown in the dotted line $c$, and the ends of the wires $e$ and $e'$ are drawn together until they take the positions indicated by the dotted lines $e''$, thus drawing the wings B and B' together. When the parts of the handle are released, the tension of the lower part of the spring separates the handles and the wings are positively restored to their normal position. These movements will be repeated intermittently upon corresponding movement and release of the handles forming the tail portion of the device.

I have described my invention and the operation thereof with reference to a practical and operative embodiment thereof. I do not, however, limit myself to the forms of construction shown; but

I claim, and desire to secure by Letters Patent, the following:

1. In a fan the combination of a body, wings hinged thereto, handle members pivoted to the body, and means for operatively connecting the wings to the handle members.

2. In a fan the combination of a body, wings hinged thereto, handles pivoted to the body, and means for operatively connecting the wings to the handles.

3. In a fan the combination of a body, wings hinged thereto, handles pivoted to the body, and spring means for operatively connecting the wings and the handles.

4. In a fan the combination of a body, wings hinged thereto, handles pivoted to the body, means for automatically extending the wings, and wing-closing means attached to the handles.

5. In a fan the combination of a body, wings hinged thereto, means for automatically spreading the wings, means for automatically extending the handles, and means for attaching the handles to the wings to close the same by closing the handles.

6. In a fan the combination of a body, wings hinged thereto, a tail portion comprising a plurality of members pivoted to the body and constituting handles, a spring having free ends attached to the wings to hold them normally extended, and so attached to the tail members that pressing said members together will close the wings.

In witness whereof I have hereunto subscribed my name, this 22d day of August, A. D. 1904, in the presence of two subscribing witnesses.

WILLIAM G. G. WEIDINGER.

Witnesses:
C. K. CHAMBERLAIN,
A. S. PHILLIPS.